United States Patent
Chen

(10) Patent No.: US 12,501,527 B2
(45) Date of Patent: Dec. 16, 2025

(54) DRIVER CIRCUIT FOR ADAPTIVELY SWITCHING LIGHT-EMITTING DIODE CURRENT

(71) Applicant: ANPEC ELECTRONICS CORPORATION, Hsinchu (TW)

(72) Inventor: Wen-Yen Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 123 days.

(21) Appl. No.: 18/415,581

(22) Filed: Jan. 17, 2024

(65) Prior Publication Data

US 2025/0089137 A1 Mar. 13, 2025

(30) Foreign Application Priority Data

Sep. 7, 2023 (TW) ................................. 112134003

(51) Int. Cl.
*H05B 45/325* (2020.01)

(52) U.S. Cl.
CPC ................................. *H05B 45/325* (2020.01)

(58) Field of Classification Search
CPC . H05B 45/325; G09G 3/32; G09G 2320/0252
See application file for complete search history.

(56) References Cited

U.S. PATENT DOCUMENTS

2009/0230998 A1* 9/2009 Hayashi .................. G09G 3/32
327/109
2021/0350754 A1* 11/2021 Lee ...................... G09G 3/3406

FOREIGN PATENT DOCUMENTS

CN 111369932 A * 7/2020 ............... G09G 3/32
JP 2009188773 A * 8/2009 ............... G09G 3/30

* cited by examiner

*Primary Examiner* — Abdullah A Riyami
*Assistant Examiner* — Syed M Kaiser
(74) *Attorney, Agent, or Firm* — Li & Cai Intellectual Property Office

(57) ABSTRACT

A driver circuit for adaptively switching a light-emitting diode current is provided. The driver circuit at least includes a first transistor, a first switching component, a second transistor, a third transistor and an operational amplifier. A first terminal of the first transistor is connected to a first input terminal of the operational amplifier. A first terminal of the first switching component is connected to a control terminal of the first transistor. A control terminal of the second transistor is connected to a second terminal of the first switching component. A first terminal of the third transistor is connected to one or more light-emitting diodes. A second terminal of the third transistor is connected to a first terminal of the second transistor and a second input terminal of the operational amplifier. An output terminal of the operational amplifier is connected to a control terminal of the third transistor.

14 Claims, 10 Drawing Sheets

DRIVER CIRCUIT FOR ADAPTIVELY SWITCHING LIGHT-EMITTING DIODE CURRENT

CROSS-REFERENCE TO RELATED PATENT APPLICATION

This application claims the benefit of priority to Taiwan Patent Application No. 112134003, filed on Sep. 7, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a driver circuit for a light-emitting diode, and more particularly to a driver circuit for adaptively switching a light-emitting diode current.

BACKGROUND OF THE DISCLOSURE

Conventional light drivers are often used to drive light-emitting diodes to emit light. A first terminal of a transistor of the conventional light driver is connected to the light-emitting diodes. In the conventional light driver, switch components are disposed between a control terminal of the transistor and an output terminal of an operational amplifier. However, the more of the switch components that are disposed in the conventional light driver, the larger a total capacitance of parasitic capacitors of the switch components of the conventional light driver is, and the longer the time required for driving the light-emitting diodes to emit light by the conventional light driver is. Therefore, configurations and operations of circuit components of the conventional light driver must be further improved for driving the light-emitting diodes to emit light at desired brightness within specified time.

SUMMARY OF THE DISCLOSURE

In response to the above-referenced technical inadequacies, the present disclosure provides a driver circuit for adaptively switching a light-emitting diode current. The driver circuit is applicable to one or more light-emitting diodes of a display device. The driver circuit includes a control circuit, a reference current source, a first transistor, a first switching component, a second transistor, a third transistor and an operational amplifier. The control circuit is connected to the display device. The control circuit is configured to output a reference current controlling signal according to brightness information of the display device. An input terminal of the reference current source is coupled to a common voltage. A control terminal of the reference current source is connected to the control circuit. The reference current source determines a current value of a reference current and outputs the reference current according to the reference current controlling signal from the control circuit. A first terminal of the first transistor is connected to an output terminal of the reference current source and a control terminal of the first transistor. A second terminal of the first transistor is grounded. A first terminal of the first switching component is connected to the control terminal of the first transistor. A control terminal of the second transistor is connected to a second terminal of the first switching component. A first terminal of the third transistor is connected to the display device. A second terminal of the third transistor is connected to a first terminal of the second transistor. A second terminal of the second transistor is grounded. A first input terminal of the operational amplifier is connected to the first terminal of the first transistor. A second input terminal of the operational amplifier is connected to the second terminal of the third transistor. An output terminal of the operational amplifier is connected to a control terminal of the third transistor.

As described above, the present disclosure provides the driver circuit for adaptively switching the light-emitting diode current. The configurations of the circuit components of the driver circuit of the present disclosure are different from that of a conventional driver circuit. Therefore, the driver circuit of the present disclosure is capable of more quickly driving the one or more light-emitting diodes (that are connected in series with each other to form a light-emitting diode string) to emit light as desired.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
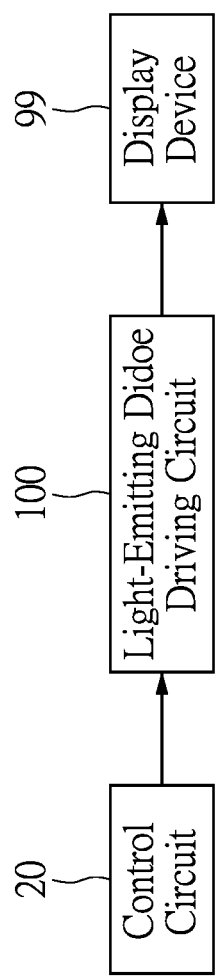
FIG. 1 is a block diagram of a driver circuit for adaptively switching a light-emitting diode current according to first to third embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
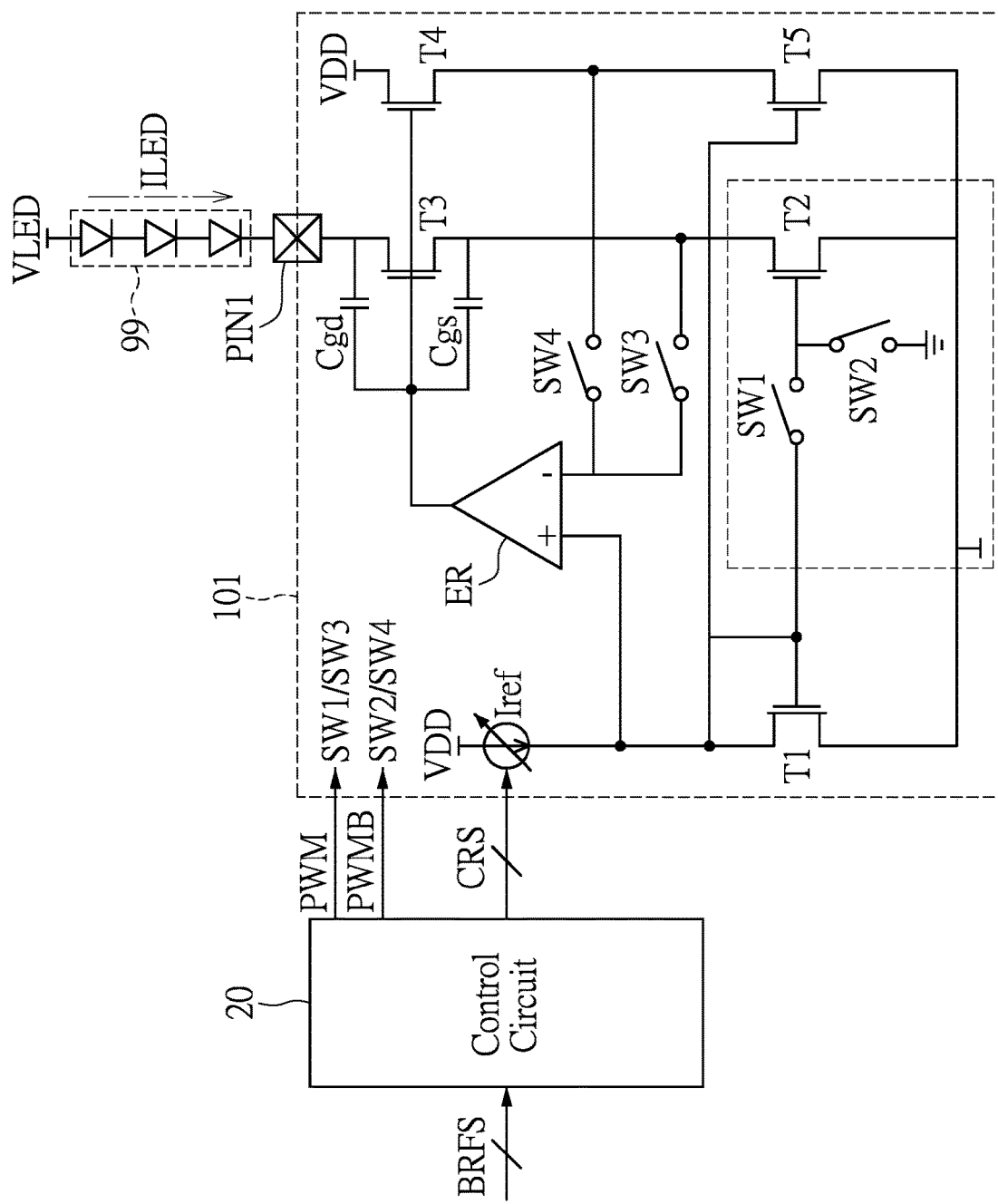
FIG. 2 is a circuit diagram of the driver circuit for adaptively switching the light-emitting diode current according to the first embodiment of the present disclosure.
Figure 3:
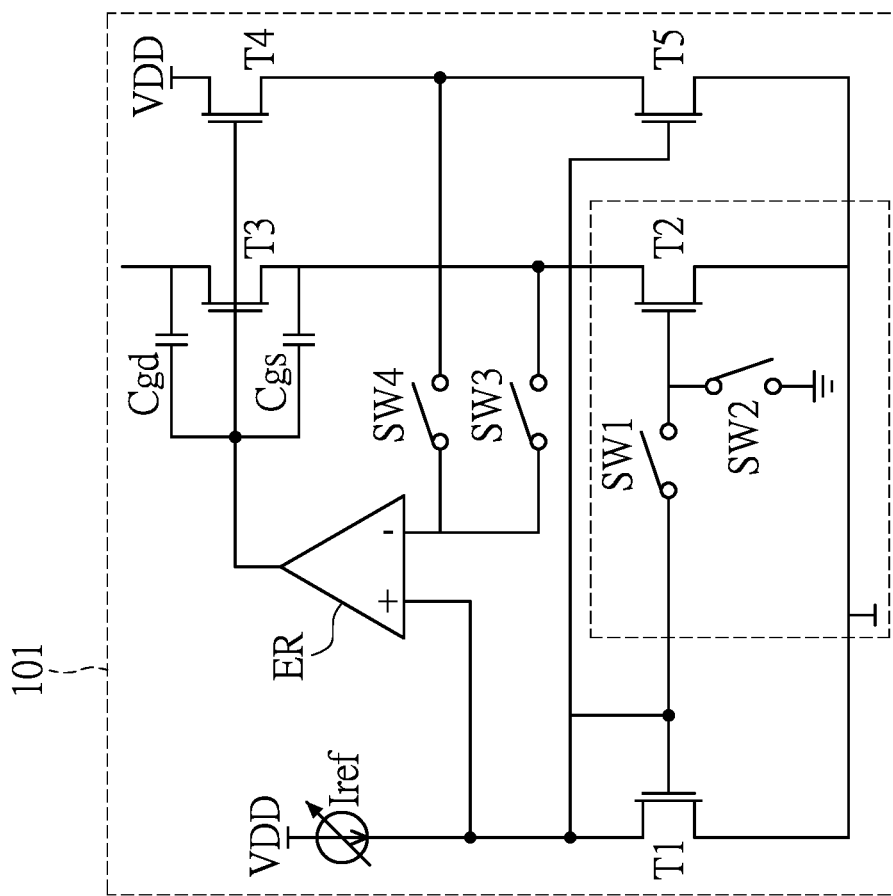
FIG. 3 is a circuit diagram of a light-emitting diode driving circuit of the driver circuit for adaptively switching the light-emitting diode current according to the first embodiment of the present disclosure.
Figure 4:
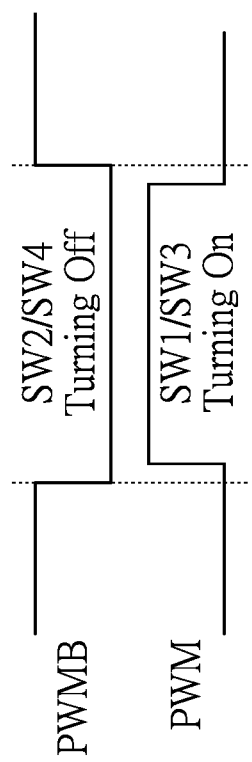
FIG. 4 is a waveform diagram of signals of the driver circuit for adaptively switching the light-emitting diode current according to the first embodiment of the present disclosure.

Reference is made to FIGS. 1 to 4, in which FIG. 1 is a block diagram of a driver circuit for adaptively switching a light-emitting diode current according to first to third embodiments of the present disclosure, FIG. 2 is a circuit diagram of the driver circuit for adaptively switching the light-emitting diode current according to the first embodiment of the present disclosure, FIG. 3 is a circuit diagram of a light-emitting diode driving circuit of the driver circuit for adaptively switching the light-emitting diode current according to the first embodiment of the present disclosure, and FIG. 4 is a waveform diagram of signals of the driver circuit for adaptively switching the light-emitting diode current according to the first embodiment of the present disclosure.

As shown in FIG. 1, the driver circuit of the present disclosure includes a light-emitting diode driving circuit 100 and a control circuit 20 for driving one or more light-emitting diodes (that are connected in series with each other to form a light-emitting diode string) of a display device 99.

In the first embodiment, the light-emitting diode driving circuit 100 may include a light-emitting diode driving circuit 101 as shown in FIG. 2.

As shown in FIG. 2 and FIG. 3, the light-emitting diode driving circuit 101 may include the following circuit components: a reference current source Iref, the first transistor T1, the first switching component SW1, the second transistor T2, the third transistor T3, the operational amplifier ER, the second switching component SW2, the third switching component SW3, the fourth transistor T4, the fifth transistor T5 and the fourth switching component SW4, but the present disclosure is not limited thereto. In practice, some of the circuit components of the light-emitting diode driving circuit 101 as shown in FIG. 2 and FIG. 3 may be omitted or replaced according to actual requirements.

An input terminal of the reference current source Iref is coupled to a common voltage VDD. A first terminal of the first transistor T1 is connected to an output terminal of the reference current source Iref and a control terminal of the first transistor T1. A second terminal of the first transistor T1 is grounded.

A first terminal of the first switching component SW1 is connected to the control terminal of the first transistor T1. A control terminal of the second transistor T2 is connected to a second terminal of the first switching component SW1. A first terminal of the second transistor T2 is connected to a second terminal of the third transistor T3. A second terminal of the second transistor T2 is grounded.

A first terminal of the second switching component SW2 is connected to the second terminal of the first switching component SW1 and the control terminal of the second transistor T2. A second terminal of the second transistor T2 is grounded.

A first input terminal such as a non-inverting input terminal of the operational amplifier ER is connected to the first terminal of the first transistor T1. A second input terminal such as an inverting input terminal of the operational amplifier ER is connected to a first terminal of the third switching component SW3 and a first terminal of the fourth switching component SW4. An output terminal of the operational amplifier ER is connected to a control terminal of the third transistor T3.

A first terminal of the third transistor T3 is connected to the one or more light-emitting diodes of the display device 99 (through a pin PIN1 of the light-emitting diode driving circuit 101). A second terminal of the third switching component SW3 is connected to a node between the second terminal of the third transistor T3 and the first terminal of the second transistor T2. A second terminal of the fourth switching component SW4 is connected to a node between a second terminal of the fourth transistor T4 and a first terminal of the fifth transistor T5.

A first terminal of the fourth transistor T4 is coupled to the common voltage VDD. A control terminal of the fourth transistor T4 is connected to the output terminal of the operational amplifier ER. The first terminal of the fifth transistor T5 is connected to the second terminal of the fourth transistor T4. A second terminal of the fifth transistor T5 is grounded. A control terminal of the fifth transistor T5 is connected to the first terminal of the first transistor T1.

The control circuit 20 may be connected to a control terminal of the reference current source Iref, and may be connected to the display device 99 or a detector circuit used for detecting the display device 99. The control circuit 20 may obtain brightness information BRFS of the display device 99 from the display device 99 or the detector circuit of the display device 99. The control circuit 20 may output a reference current controlling signal CRS to the reference current source Iref of the light-emitting diode driving circuit 101 according to the brightness information BRFS of the display device 99.

When the control terminal of the reference current source Iref receives the reference current controlling signal CRS from the control circuit 20, the reference current source Iref determines a current value of a reference current and outputs the reference current to the first terminal of the first transistor T1 according to the reference current controlling signal CRS.

The control circuit 20 may be connected to a control terminal of the first switching component SW1, a control terminal of the second switching component SW2, a control terminal of the third switching component SW3 and a control terminal of the fourth switching component SW4.

The control circuit 20 may, according to the brightness information BRFS of the display device 99, output a pulse width modulation inverted level signal PWMB to the control terminal of the second switching component SW2 and the control terminal of the fourth switching component SW4 as shown in FIG. 2 and FIG. 4.

The second switching component SW2 and the fourth switching component SW4 operate according to the pulse width modulation inverted level signal PWMB from the control circuit 20. As shown in FIG. 4, the second switching component SW2 and the fourth switching component SW4 are turned on during a working period of the pulse width modulation inverted level signal PWMB (that is aligned with a non-working period of the pulse width modulation signal PWM).

When the second switching component SW2 and the fourth switching component SW4 are turned on, the control terminal of the second transistor T2 is grounded through the second switching component SW2 such that the second transistor T2 is turned off, and a voltage of the node between the second terminal of the fourth transistor T4 and the first terminal of the fifth transistor T5 is inputted to the second input terminal such as the inverting input terminal of the operational amplifier ER. At the same time, the first input terminal such as the non-inverting input terminal of the operational amplifier ER receives a voltage of the first terminal of the first transistor T1.

As a result, the voltage of the second input terminal such as the inverting input terminal of the operational amplifier ER is directly pulled to a voltage being equal to the voltage of the node between the second terminal of the fourth transistor T4 and the first terminal of the fifth transistor T5.

The operational amplifier ER multiplies a voltage difference between the voltage of the first terminal of the first transistor T1 and the voltage of the node between the second terminal of the fourth transistor T4 and the first terminal of the fifth transistor T5 by a gain to output an operation amplified signal to the control terminal of the third transistor T3 for controlling an operation of the third transistor T3. As a result, a setting of a bias voltage point in a feedback path of the display device 99 is maintained.

Therefore, the driver circuit of the present disclosure is capable of quickly driving the display device 99 to emit light.

The control circuit 20 may, according to the brightness information BRFS of the display device 99, output a pulse width modulation signal PWM to the control terminal of the first switching component SW1 and the control terminal of the third switching component SW3 as shown in FIG. 2 and FIG. 4.

The first switching component SW1 and the third switching component SW3 operate according to the pulse width modulation signal PWM from the control circuit 20. As shown in FIG. 4, the first switching component SW1 and the third switching component SW3 are turned on during the working period of the pulse width modulation signal PWM.

When the first switching component SW1 and the third switching component SW3 are turned on, the control terminal of the second transistor T2 is connected to the control terminal of the first transistor T1 through the first switching component SW1, and a voltage of node between the second terminal of the third transistor T3 and the first terminal of the second transistor T2 is inputted to the second input terminal such as the inverting input terminal of the operational amplifier ER through the third switching component SW3. At the same time, the first input terminal such as the non-inverting input terminal of the operational amplifier ER receives the voltage of the first terminal of the first transistor T1.

Under this condition, the operational amplifier ER multiples a voltage difference between the voltage of the first terminal of the first transistor T1 and the voltage of the node between the second terminal of the third transistor T3 and the first terminal of the second transistor T2 by the gain to output an operation amplified signal to the control terminal of the third transistor T3. The operation of the third transistor T3 is controlled to appropriately adjust a current ILED of the display device 99 according to the operation amplified signal.

As shown in FIG. 2, in the driver circuit of the present disclosure, a parasitic capacitor Cgs is connected between a gate terminal and a source terminal of the third transistor T3 and a parasitic capacitor Cgd is connected between the gate terminal and a drain terminal of the third transistor T3. However, no switch or switching components are connected between the control terminal of the third transistor T3 and the output terminal of the operational amplifier ER. Therefore, a response speed at which the display device 99 operates according to driving of the driver circuit of the present disclosure is not affected by parasitic capacitors of the switch component and the switching component between the control terminal of the third transistor T3 and the output terminal of the operational amplifier ER. When no current flows through the display device 99, a feedback bias voltage point and a signal of the control terminal of the third transistor T3 are maintained in an initial bias voltage state. Then, when a current flows through the display device 99, the feedback bias voltage point and the signal of the control terminal of the third transistor T3 directly changes from the initial bias voltage state to a target bias voltage state that is approximately equal to the initial bias voltage state such that the current is quickly increased to a target current value.

Figure 5:
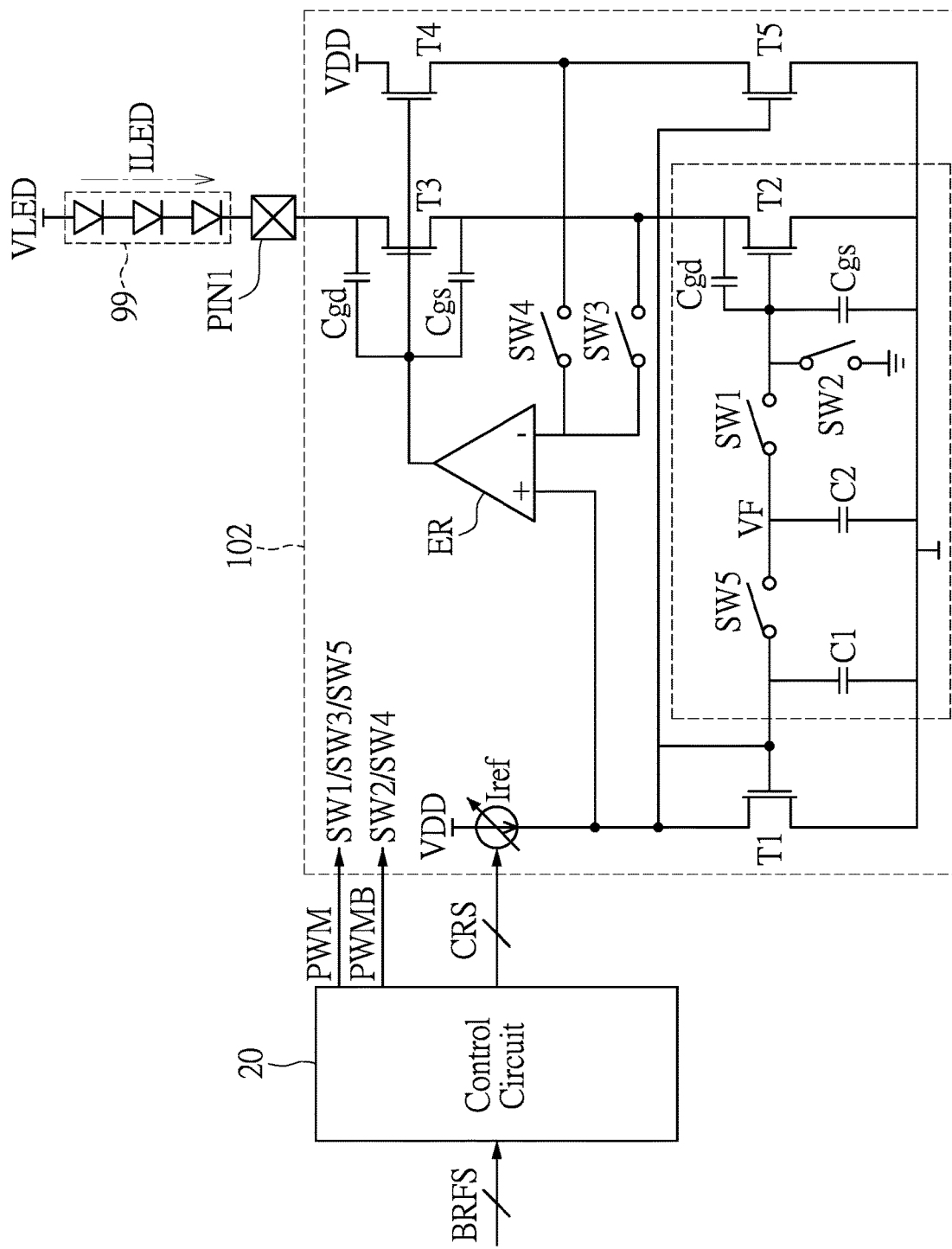
FIG. 5 is a circuit diagram of the driver circuit for adaptively switching the light-emitting diode current according to the second embodiment of the present disclosure.
Figure 6:
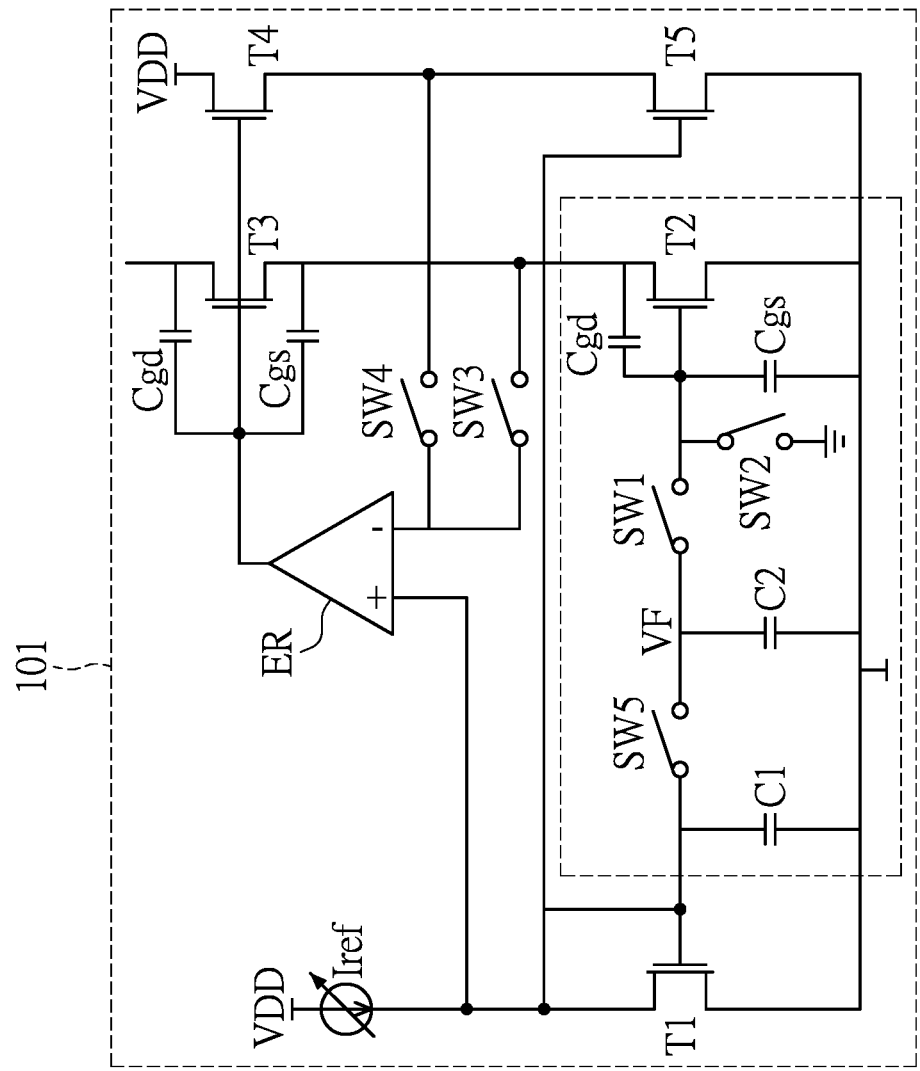
FIG. 6 is a circuit diagram of a light-emitting diode driving circuit of the driver circuit for adaptively switching the light-emitting diode current according to the second embodiment of the present disclosure.
Figure 7:
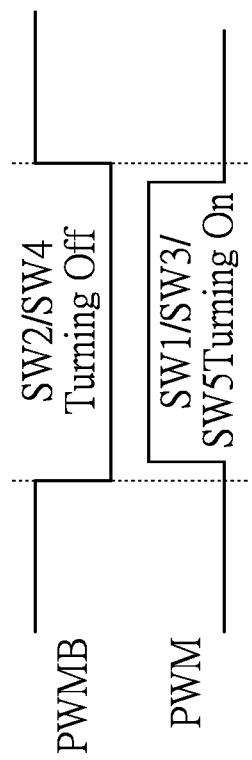
FIG. 7 is a waveform diagram of signals of the driver circuit for adaptively switching the light-emitting diode current according to the second embodiment of the present disclosure.

Reference is made to FIGS. 5 to 7, in which FIG. 5 is a circuit diagram of the driver circuit for adaptively switching the light-emitting diode current according to the second embodiment of the present disclosure, FIG. 6 is a circuit diagram of a light-emitting diode driving circuit of the driver circuit for adaptively switching the light-emitting diode current according to the second embodiment of the present disclosure, and FIG. 7 is a waveform diagram of signals of the driver circuit for adaptively switching the light-emitting diode current according to the second embodiment of the present disclosure.

The same descriptions of the second embodiment of the present disclosure that are the same as that of the first embodiment of the present disclosure are not repeated herein.

A difference between the second and first embodiments of the present disclosure is that, a light-emitting diode driving circuit 102 of the driver circuit of the second embodiment of the present disclosure further includes a first capacitor C1, a second capacitor C2 and a fifth switching component SW5 as shown in FIG. 5 and FIG. 6.

A first terminal of the first capacitor C1 is connected to the control terminal of the first transistor T1. A second terminal of the first capacitor C1 is grounded. A first terminal of the second capacitor C2 is connected to the first terminal of the first switching component SW1. A second terminal of the second capacitor C2 is grounded.

A first terminal of the fifth switching component SW5 is connected to the control terminal of the first transistor T1 and the first terminal of the first capacitor C1. A second terminal of the fifth switching component SW5 is connected to the first terminal of the first switching component SW1 and the first terminal of the second capacitor C2.

A control terminal of the fifth switching component SW5 may be connected to the control circuit 20, and may receive the pulse width modulation signal PWM from the control circuit 20.

As shown in FIG. 7, the fifth switching component SW5 operates according to the pulse width modulation signal PWM from the control circuit 20. The first switching component SW1, the third switching component SW3 and the fifth switching component SW5 are turned on during the working period of the pulse width modulation signal PWM.

Figure 8:
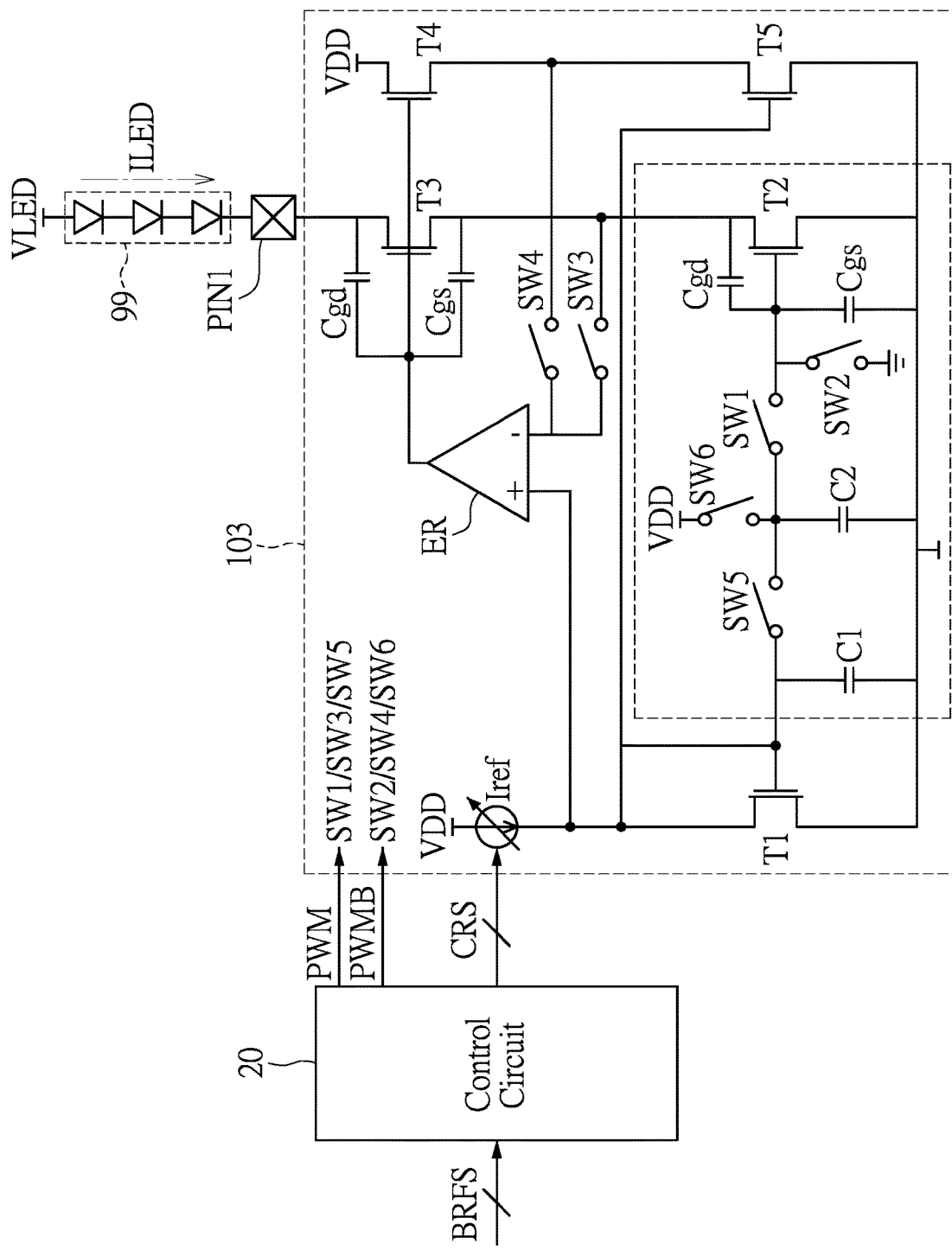
FIG. 8 is a circuit diagram of the driver circuit for adaptively switching the light-emitting diode current according to the third embodiment of the present disclosure.
Figure 9:
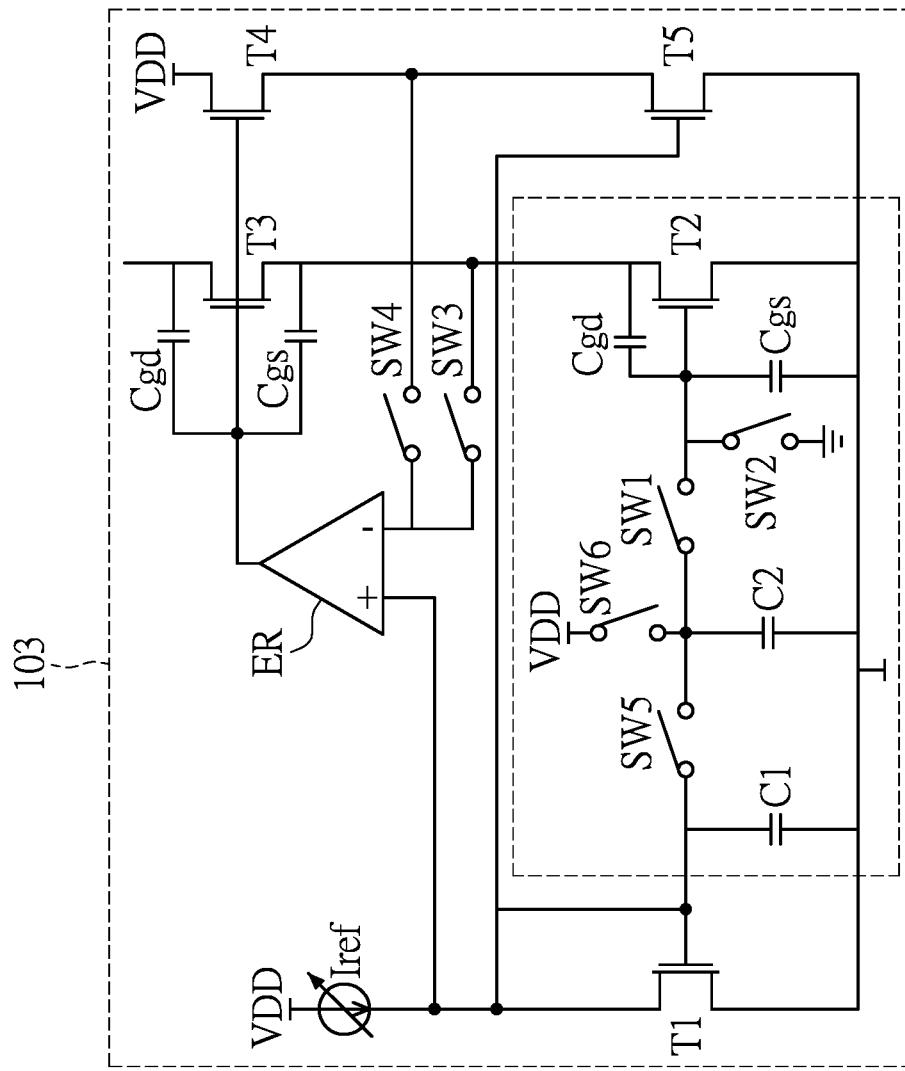
FIG. 9 is a circuit diagram of a light-emitting diode driving circuit of the driver circuit for adaptively switching the light-emitting diode current according to the third embodiment of the present disclosure.
Figure 10:
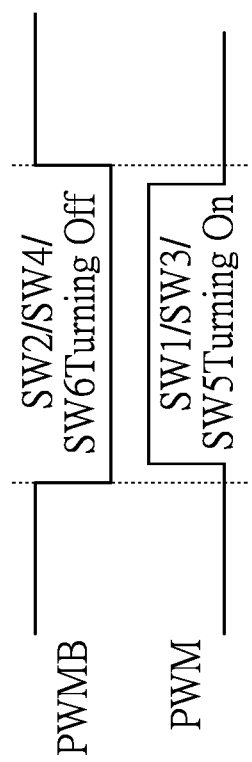
FIG. 10 is a waveform diagram of signals of the driver circuit for adaptively switching the light-emitting diode current according to the third embodiment of the present disclosure.

Reference is made to FIG. 8 to FIG. 10, in which FIG. 8 is a circuit diagram of the driver circuit for adaptively switching the light-emitting diode current according to the third embodiment of the present disclosure, FIG. 9 is a circuit diagram of a light-emitting diode driving circuit of the driver circuit for adaptively switching the light-emitting diode current according to the third embodiment of the present disclosure, and FIG. 10 is a waveform diagram of signals of the driver circuit for adaptively switching the light-emitting diode current according to the third embodiment of the present disclosure.

The same descriptions of the third embodiment of the present disclosure that are the same as that of the first and second embodiments of the present disclosure are not repeated herein.

A difference between the third and embodiments of the present disclosure is that, a light-emitting diode driving circuit 103 of the driver circuit of the third embodiment of the present disclosure further includes a sixth switching component SW6 as shown in FIG. 9 and FIG. 8.

As shown in FIG. 5 and FIG. 6, in the light-emitting diode driving circuit 102 of the second embodiment of the present disclosure, the first terminal of the second capacitor C2 is coupled to a reference voltage VF, or a voltage of a node between the first terminal of the second capacitor C2 and the second terminal of the fifth switching component SW5 is the reference voltage VF.

In contrast, as shown in FIG. 9 and FIG. 8, in the light-emitting diode driving circuit 103 of the third embodiment of the present disclosure, a first terminal of the sixth switching component SW6 is coupled to the common voltage VDD. A second terminal of the sixth switching component SW6 is connected to the first terminal of the second capacitor C2, the second terminal of the fifth switching component SW5 and the first terminal of the first switching component SW1.

A control terminal of the sixth switching component SW6 may be connected to the control circuit 20 and may receive the pulse width modulation inverted level signal PWMB from the control circuit 20.

As shown in FIG. 10, the sixth switching component SW6 may operate according to the pulse width modulation inverted level signal PWMB from the control circuit 20, and the fifth switching component SW5 may operate according to the pulse width modulation signal PWM from the control circuit 20. Therefore, the sixth switching component SW6 and the fifth switching component SW5 may be complementarily switched.

In conclusion, the present disclosure provides the driver circuit for adaptively switching the light-emitting diode current. The configurations of the circuit components of the driver circuit of the present disclosure are different from that of a conventional driver circuit. Therefore, the driver circuit of the present disclosure is capable of more quickly driving the one or more light-emitting diodes (that are connected in series with each other to form the light-emitting diode string) to emit light as desired.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A driver circuit for adaptively switching a light-emitting diode current, which is applicable to one or more light-emitting diodes of a display device, the driver circuit comprising:
    a control circuit connected to the display device and configured to output a reference current controlling signal according to brightness information of the display device;
    a reference current source, wherein an input terminal of the reference current source is coupled to a common voltage, a control terminal of the reference current source is connected to the control circuit, and the reference current source determines a current value of a reference current and outputs the reference current according to the reference current controlling signal from the control circuit;
    a first transistor, wherein a first terminal of the first transistor is connected to an output terminal of the reference current source and a control terminal of the first transistor, and a second terminal of the first transistor is grounded;
    a first switching component, wherein a first terminal of the first switching component is connected to the control terminal of the first transistor;
    a second transistor, wherein a control terminal of the second transistor is connected to a second terminal of the first switching component;
    a third transistor, wherein a first terminal of the third transistor is connected to the display device, a second terminal of the third transistor is connected to a first terminal of the second transistor, and a second terminal of the second transistor is grounded;
    an operational amplifier, wherein a first input terminal of the operational amplifier is connected to the first terminal of the first transistor, and an output terminal of the operational amplifier is connected to a control terminal of the third transistor;

a second switching component, wherein a first terminal of the second switching component is connected to the second terminal of the first switching component and the control terminal of the second transistor, and a second terminal of the second switching component is grounded; and a third switching component, wherein a first terminal of the third switching component is connected to a second input terminal of the operational amplifier, and a second terminal of the third switching component is connected to a node between the second terminal of the third transistor and the first terminal of the second transistor.

2. The driver circuit according to claim 1, further comprising:
a fourth transistor, wherein a first terminal of the fourth transistor is coupled to the common voltage, a control terminal of the fourth transistor is connected to the output terminal of the operational amplifier, and a second terminal of the fourth transistor is grounded.

3. The driver circuit according to claim 2, further comprising:
a fifth transistor, wherein a first terminal of the fifth transistor is connected to the second terminal of the fourth transistor, a second terminal of the fifth transistor is grounded, and a control terminal of the fifth transistor is connected to the first terminal of the first transistor.

4. The driver circuit according to claim 3, further comprising:
a fourth switching component, wherein a first terminal of the fourth switching component is connected to the second input terminal of the operational amplifier, and a second terminal of the fourth switching component is connected to a node between the first terminal of the fifth transistor and the second terminal of the fourth transistor.

5. The driver circuit according to claim 4, further comprising:
a first capacitor, wherein a first terminal of the first capacitor is connected to the control terminal of the first transistor, and a second terminal of the first capacitor is grounded.

6. The driver circuit according to claim 5, further comprising:
a second capacitor, wherein a first terminal of the second capacitor is connected to the first terminal of the first switching component, and a second terminal of the second capacitor is grounded.

7. The driver circuit according to claim 6, further comprising:
a fifth switching component, wherein a first terminal of the fifth switching component is connected to the control terminal of the first transistor, and a second terminal of the fifth switching component is connected to the first terminal of the first switching component and the first terminal of the second capacitor.

8. The driver circuit according to claim 7, further comprising:
a sixth switching component, wherein a first terminal of the sixth switching component is coupled to the common voltage, and a second terminal of the sixth switching component is connected to the first terminal of the second capacitor.

9. The driver circuit according to claim 8, wherein the control terminal of the first switching component is connected to the control circuit and receives a pulse width modulation signal from the control circuit, and the first switching component operates according to the pulse width modulation signal from the control circuit.

10. The driver circuit according to claim 9, wherein the control terminal of the second switching component is connected to the control circuit and receives a pulse width modulation inverted level signal from the control circuit, the second switching component operates according to the pulse width modulation inverted level signal from the control circuit, and the second switching component and the first switching component are complementarily switched.

11. The driver circuit according to claim 10, wherein the control terminal of the third switching component is connected to the control circuit and receives the pulse width modulation signal from the control circuit, and the third switching component operates according to the pulse width modulation signal from the control circuit.

12. The driver circuit according to claim 11, wherein the control terminal of the fourth switching component is connected to the control circuit and receives the pulse width modulation inverted level signal from the control circuit, the fourth switching component operates according to the pulse width modulation inverted level signal from the control circuit, and the fourth switching component and the third switching component are complementarily switched.

13. The driver circuit according to claim 12, wherein the control terminal of the fifth switching component is connected to the control circuit and receives the pulse width modulation signal from the control circuit, and the fifth switching component operates according to the pulse width modulation signal from the control circuit.

14. The driver circuit according to claim 13, wherein the control terminal of the sixth switching component is connected to the control circuit and receives the pulse width modulation inverted level signal from the control circuit, the sixth switching component operates according to the pulse width modulation inverted level signal from the control circuit, and the sixth switching component and the fifth switching component are complementarily switched.

* * * * *